(12) United States Patent
Miya et al.

(10) Patent No.: US 7,266,096 B2
(45) Date of Patent: Sep. 4, 2007

(54) RADIO INFRASTRUCTURE APPARATUS

(75) Inventors: Kazuyuki Miya, Kawasaki (JP);
Katsuhiko Hiramatsu, Yokosuka (JP);
Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 968 days.

(21) Appl. No.: 10/169,902

(22) PCT Filed: Nov. 27, 2001

(86) PCT No.: PCT/JP01/10306

§ 371 (c)(1),
(2), (4) Date: Jul. 11, 2002

(87) PCT Pub. No.: WO02/45296

PCT Pub. Date: Jun. 6, 2002

(65) Prior Publication Data

US 2002/0191582 A1 Dec. 19, 2002

(30) Foreign Application Priority Data

Nov. 29, 2000 (JP) .............................. 2000-363621

(51) Int. Cl.
*H04B 7/212* (2006.01)
*H04B 7/216* (2006.01)
*H04B 7/00* (2006.01)
*H04Q 7/20* (2006.01)

(52) U.S. Cl. .................... 370/322; 370/320; 370/328; 370/335; 370/342; 370/441; 455/522; 455/439

(58) Field of Classification Search .................. None
See application file for complete search history.

(56) References Cited

U.S. PATENT DOCUMENTS

2002/0003785 A1* 1/2002 Agin ........................ 370/333

(Continued)

FOREIGN PATENT DOCUMENTS

JP 08181653 7/1996

(Continued)

OTHER PUBLICATIONS

International Search Report dated Feb. 26, 2002.

(Continued)

*Primary Examiner*—Chi Pham
*Assistant Examiner*—Ronald Abelson
(74) *Attorney, Agent, or Firm*—Stevens, Davis, Miller & Mosher, LLP

(57) ABSTRACT

Error detection section 109 carries out error detection using demodulated data and outputs an error rate to SIR versus error rate estimation section 110. SIR versus error rate estimation section 110 estimates an SIR versus error rate and outputs the result of decision as to whether the correction of the target SIR value is necessary or not to target SIR correction section 111. Target SIR correction section 111 corrects the target SIR value based on the decision result. The information on the demodulation capability of a BTS is output to G parameter control section 112 and G parameter control section 112 determines an optimal gain factor. A G parameter indicating the determined gain factor is output to multiplexing section 107 of the BTS. The G parameter is output to SIR versus error rate estimation section 110. This makes it possible to perform communications with an optimal gain factor and target SIR during diversity handover between base stations with and without an interference canceller or between base stations with interference cancellers of different capabilities.

13 Claims, 12 Drawing Sheets

U.S. PATENT DOCUMENTS

2002/0009061 A1* 1/2002 Willenegger ................ 370/328
2002/0093922 A1* 7/2002 Grilli et al. ................. 370/328
2002/0131381 A1* 9/2002 Kim et al. ................... 370/335

FOREIGN PATENT DOCUMENTS

| JP | 09139712 | 5/1997 |
|---|---|---|
| JP | 11150754 | 6/1999 |
| JP | 11284570 | 10/1999 |
| JP | 11308655 | 11/1999 |
| JP | 2000102052 | 4/2000 |
| JP | 2000138633 | 5/2000 |
| JP | 2000151484 | 5/2000 |
| JP | 2000252917 | 9/2000 |
| JP | 2001517001 | 10/2001 |

OTHER PUBLICATIONS

K. Okawa, et al.; "Effect of Interference Rejection Weight Control on Parallel-type Coherent Multistage Interference Canceller with Iterative Channel Estimation", Technical Report of IEICE, with English Abstract.

* cited by examiner

RADIO INFRASTRUCTURE APPARATUS

TECHNICAL FIELD

The present invention relates to a digital radio communication system, and more particularly, to a radio infrastructure apparatus in a CDMA (Code Division Multiple Access) system.

BACKGROUND ART

In a digital radio communication system, an interference canceller technology, which estimates a desired signal and interference signal based on maximum likelihood estimation, is used. There are interference canceller systems in a CDMA system such as a single user (SUD: Single User Detection) type and multi-user (MUD: Multi User Detection) type.

As the MUD, there are a multi-stage type interference canceller that improves a reception characteristic by repeating a plurality of times (multi-stage) processing on the receiving side of generating interference replica signals of other users based on channel estimated values and decision data, subtracting these replica signals from a received signal and thereby improving an SIR (Signal to Interference Ratio), and a single-stage type interference canceller that improves a reception characteristic by applying ranking processing to likelihood of all symbols of all channels, generating replica signals for symbols in descending order of likelihood and subtracting the replica signals from a received signal on the receiving side and thereby improving an SIR.

A W-CDMA (Wideband-Code Division Multiple Access) of a digital radio communication system is a system suitable for implementing a multimedia communication handling various transmission rates. Technologies concerning an application of an interference canceller to this W-CDMA currently being developed and published by research organizations are technologies mainly applied to an uplink DPCH (Dedicated Physical CHannel).

That is, in an application of an interference canceller to W-CDMA, this technology creates replica signals from a received signal of DPDCH (Dedicated Physical Data CHannel) or DPCCH (Dedicated Physical Control CHannel) of other stations and subtracts those replica signals from a total received signal and thereby cancels interference components from the received signals through demodulation at the own station. This technology is intended to mainly implement a reduction of required Eb/No (SIR) of DPDCH by applying an interference canceller (MUD) to a base station.

Even if replica signals are created using either DPDCHs or DPCCHs of other stations, this technology cancels interference among other stations from the received signal only through demodulation of DPDCHs. This is because delays involved in the processing by an interference canceller of creating replica signals and subtracting the replica signals from the received signal can be tolerated for DPDCHs more or less (about several frames).

For an interference canceller technology such as MUD, reducing not only an amount of processing but also a processing delay is an important issue in implementation. An actually reported demodulation delay of DPDCH (data section) by an interference canceller is on the order of several slots to several frames.

On the other hand, an allowable amount of delay of signals transmitted with DPCCH is restricted a great deal. For example, in the case where a slot configuration of an uplink signal is determined as shown in FIG. 1, that is, DPDCH is assigned to an in-phase component (Ich) and DPCCH is assigned to a quadrature component (Qch), it is stipulated for standardization as shown in FIG. 2 that the receiving side should change transmission power (indicated by arrow X in FIG. 2) from the first pilot signal immediately after a TPC bit is received according to a TPC (Transmission Power Control) bit for transmission power control. This allows a processing delay of only several tens of µs. Furthermore, only a processing delay of not more than 1 slot is allowed for demodulation of FBI (FeedBack Information) which is a command for transmission diversity or SSDT (Site Selection Diversity Transmission) or TFCI (Transport-Format Combination Indicator) indicating the type of communication quality such as a transmission rate and service depending on the purpose of use.

Therefore, demodulation of a DPCCH signal with such a small amount of allowable processing delay needs to be processed before canceling interference or in the middle of cancellation of interference. Thus, unlike DPDCH, it is difficult to implement an improvement of a DPCCH reception characteristic by an interference canceller, that is, a reduction of a required SIR or Eb/No, etc.

When such an interference canceller is introduced to a base station, interference with the DPDCH is reduced as shown in FIG. 3, and therefore it is possible to reduce transmission power of the DPDCH at the communication terminal and reduce interference with other stations. Thus, by reducing the transmission power of the DPDCH it is also possible to reduce the transmission power of the DPCCH.

However, utilizing the effect (area indicated by broken line in FIG. 3) resulting from a reduction of the transmission power of the DPDCH at the communication terminal for increasing the system capacity, that is, utilizing the effect for additions of new users will result in an increase of interference corresponding to the additional users, which requires relatively more transmission power of the DPCCH, preventing transmission power required for DPCCHs with a restricted demodulation delay such as channel estimation and demodulation of a TPC command from reducing.

Thus, as opposed to again factor (G) in transmitting DPDCH multiplexed with DPCCH when no interference canceller is introduced, this gain factor changes a great deal when an interference canceller is introduced to a base station.

An optimal gain factor depends on the capability of an interference canceller, that is, interference cancellation performance, applicable channels (e.g., only applicable to a communication channel (DPCH) at a specific transmission rate), applicable parts (e.g., applied to only DPDCH). Therefore, the optimal gain factor differs a great deal between a base station to which no interference canceller is applied and a base station to which an interference canceller is applied. In addition, the optimal gain factor may also differ between base stations using interference cancellers of different capabilities.

By the way, it is stipulated by 3GPP (3rd Generation Partnership Project) that the value of this gain factor should be determined on the network side (upper layer) and transmitted to the communication terminal side by a control signal.

On the other hand, transmission power control (power control) is constructed of an inner loop which is controlled by a base station using a target SIR as a base and an outer loop in which an RNC (Radio Network Controller) controls a target SIR using channel quality (bit error rate (BER) or a block error rate (BLER) as a base.

The value of the target SIR controlled by the RNC through the outer loop during diversity handover (Diversity Hand Over: DHO) is controlled as a value common to a plurality of base stations and as the only value. This is because there is a premise that the SIR value satisfying required quality (BLER, etc.) does not vary drastically among a plurality of base stations.

During diversity handover, a communication terminal communicates with two base stations simultaneously. As described above, an optimal gain factor differs when the communication terminal is communicating with a base station with no interference canceller and when communicating with a base station with an interference canceller. Therefore, how to determine an optimal gain factor during diversity handover when there is a difference between base stations with and without an interference canceller or between base stations with interference cancellers of different capabilities is a question, but it is an actual situation that there is no technique to solve this problem.

Furthermore, when an interference canceller is introduced to a base station, the reception capability with respect to a target SIR, that is, a relationship between the SIR of DPCCH and the quality of DPDCH (BER, BLER) is changed. Therefore, even if the measured value of the SIR of DPCCH is constant, the channel quality of DPDCH may vary depending on the demodulation capability (basic reception capability, presence/absence of an interference canceller or its interference cancellation capability, etc.) of DPDCH of each base station.

Therefore, keeping the same relationship between the SIR of DPCCH and the quality of DPDCH (BER, BLER) for when an interference canceller is introduced to a base station and when no interference canceller is introduced to a base station requires the gain factor to be adjusted according to whether or not to use an interference canceller or the capability of each interference canceller.

However, during diversity handover, a communication terminal sends a signal with DPDCH and DPCCH multiplexed made up of a common gain factor. Thus, it is unavoidable that the relationship between the SIR of DPCCH and the quality of DPDCH (BER, BLER) will vary from one base station to another that receives the signal.

DISCLOSURE OF INVENTION

It is an object of the present invention to provide a radio infrastructure apparatus capable of carrying out communications with an optimal gain factor during diversity handover between base stations with and without an interference canceller or between base stations with different reception capabilities with respect to a target SIR such as the capabilities of interference cancellers and performing outer loop control in such a way that there is no significant difference in the communication quality of DPDCH between base stations.

This object can be attained by correcting a target SIR using an adaptively controlled optimal gain factor, etc. and calculating an independent SIR value for each base station.

BEST METHOD FOR CARRYING OUT THE INVENTION

With reference now to the attached drawings, embodiments of the present invention will be explained in detail below.

Embodiment 1

Figure 1:
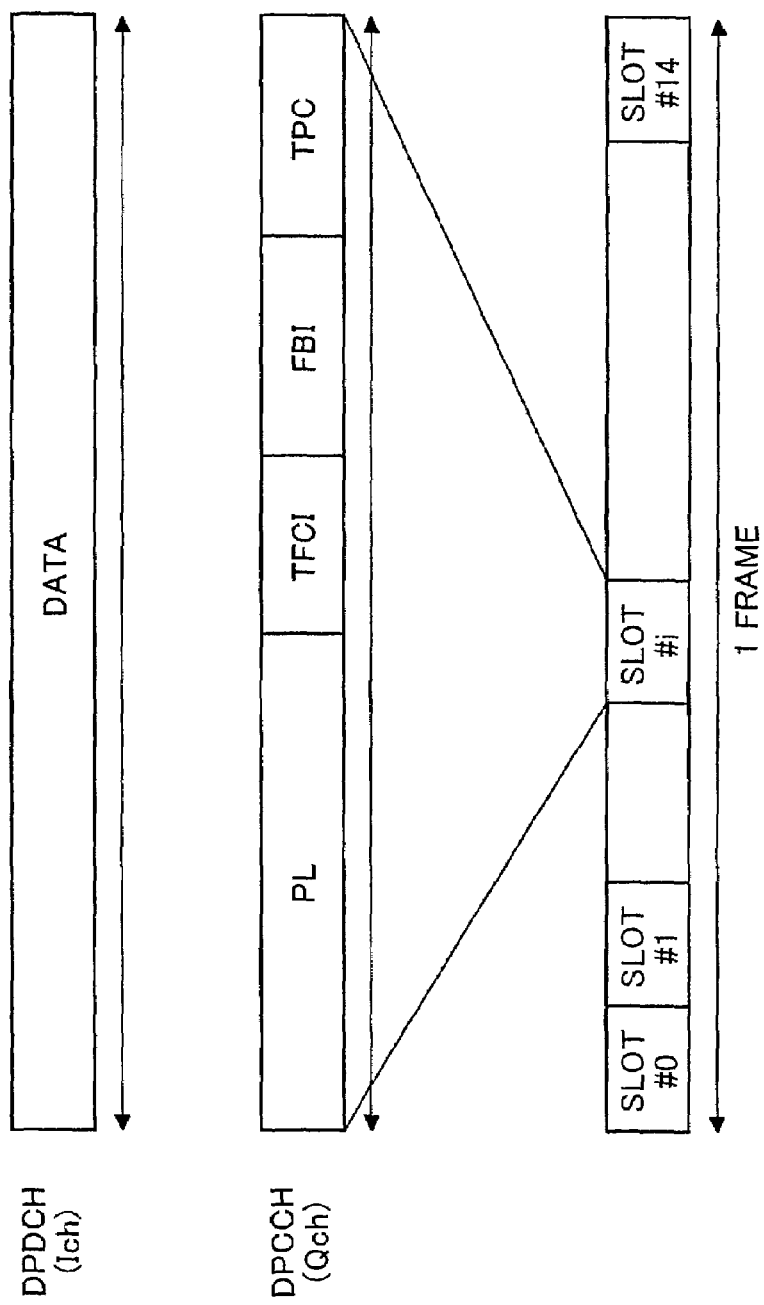
FIG. 1 illustrates a frame format of an uplink channel.
Figure 2:
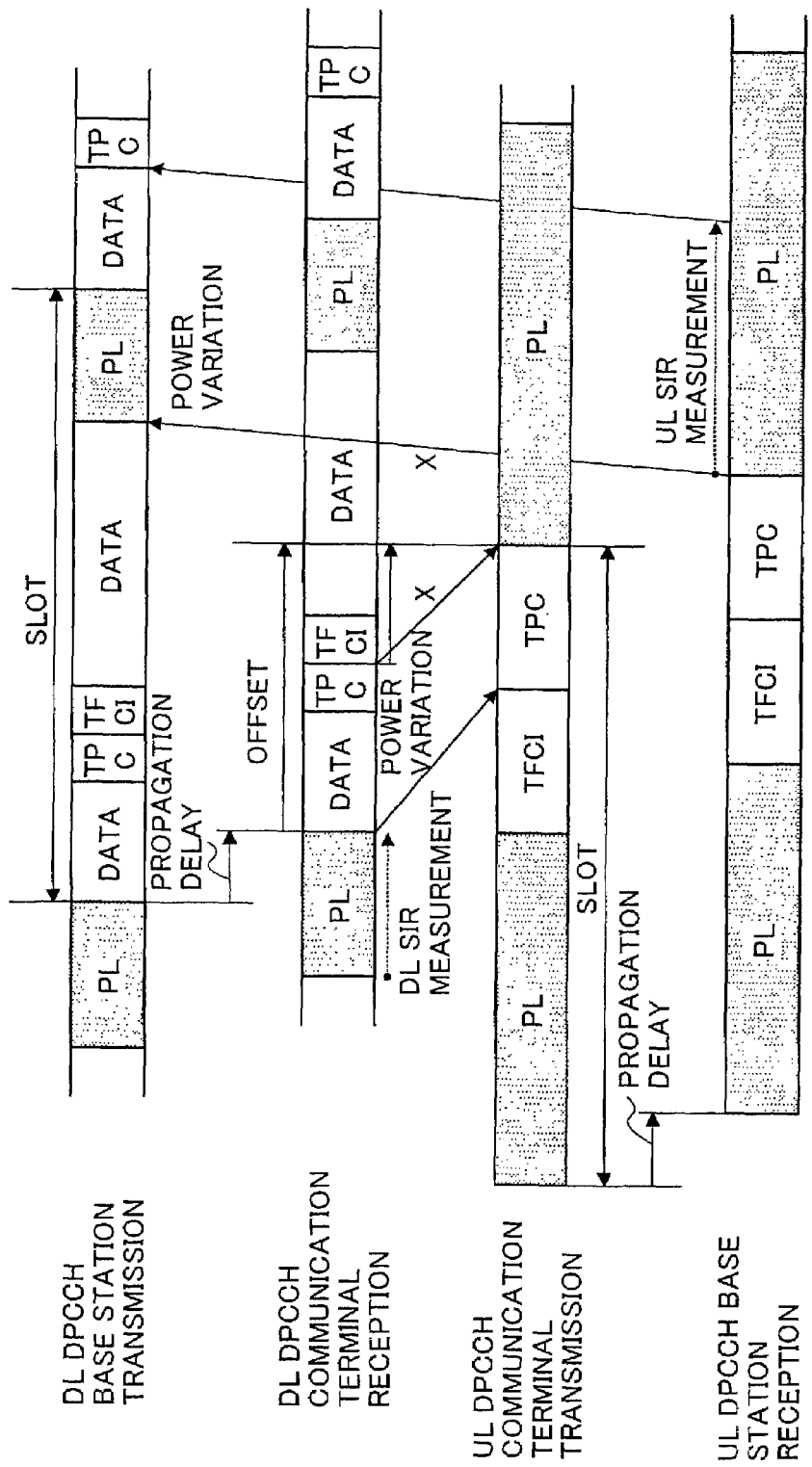
FIG. 2 illustrates transmission power control timing.
Figure 3:
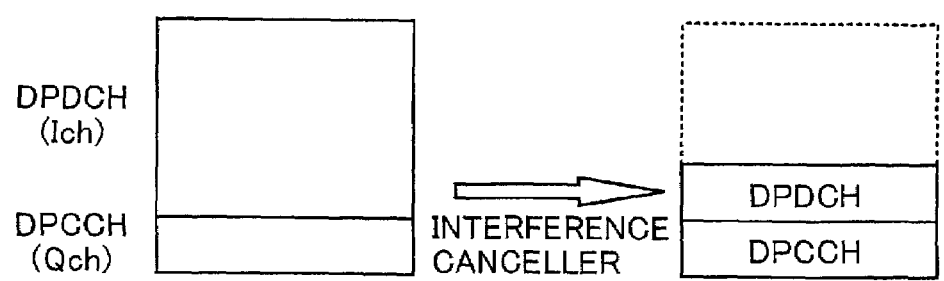
FIG. 3 illustrates a reception characteristic gain.
Figure 4:
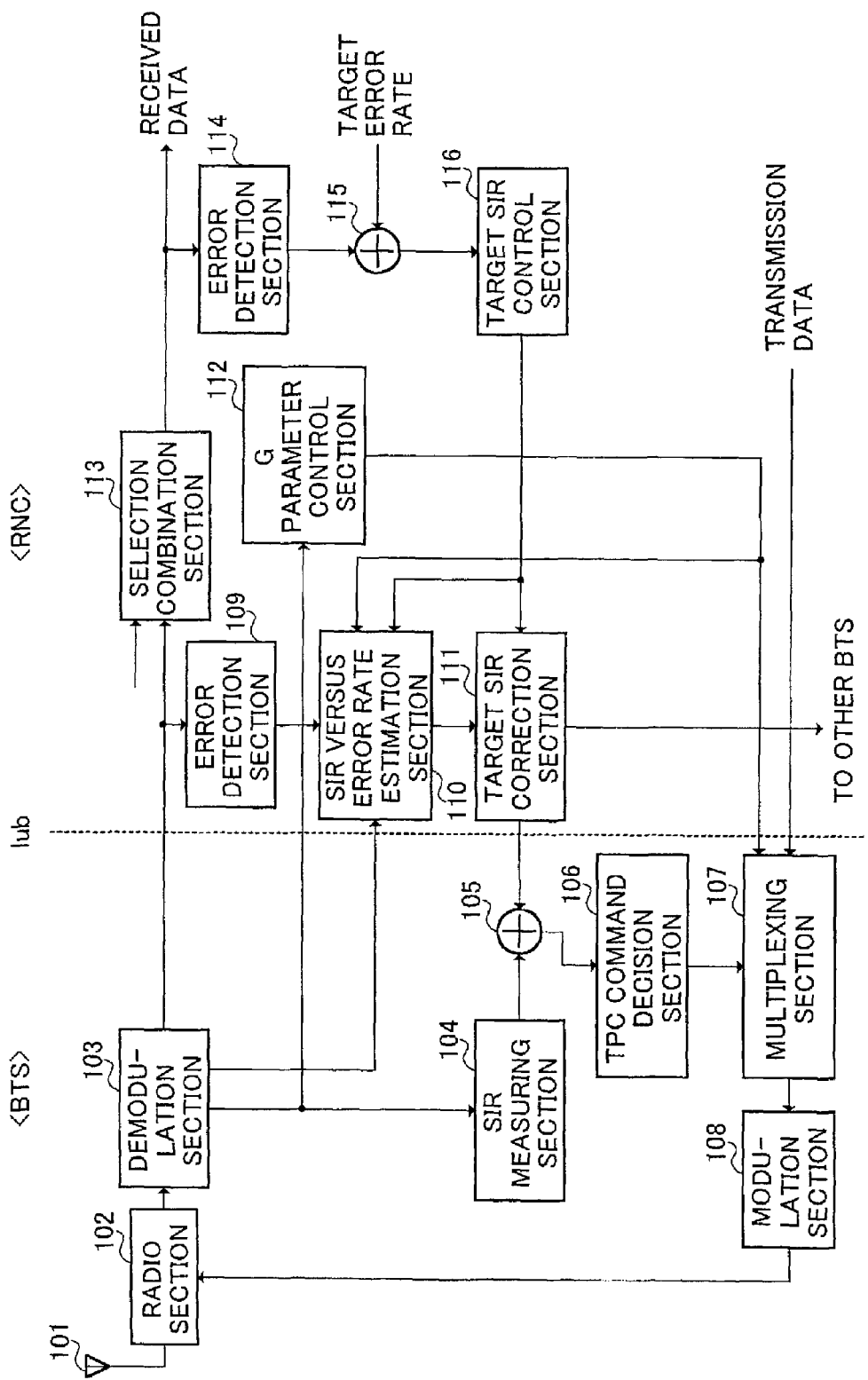
FIG. 4 is a block diagram showing a configuration of a radio infrastructure apparatus according to Embodiment 1 of the present invention.

FIG. 4 is a block diagram showing a configuration of a radio infrastructure apparatus according to Embodiment 1 of the present invention. In FIG. 4, "BTS" denotes a base station and "RNC" denotes a control station. "Iub" denotes an interface. The radio infrastructure apparatus according to this embodiment adopts a configuration whereby a target SIR is corrected inside the RNC.

First, the base station side will be explained. An uplink signal sent from a communication terminal with which the base station is communicating is received by radio section 102 via antenna 101. Radio section 102 performs predetermined radio reception processing (down-conversion and A/D conversion, etc.) on the uplink signal and outputs the signal after the radio reception processing to demodulation section 103. Demodulation section 103 carries out processing such as despreading processing, coherent detection, RAKE combining, channel CODEC and separation and is provided with an interference canceller.

Figure 5:
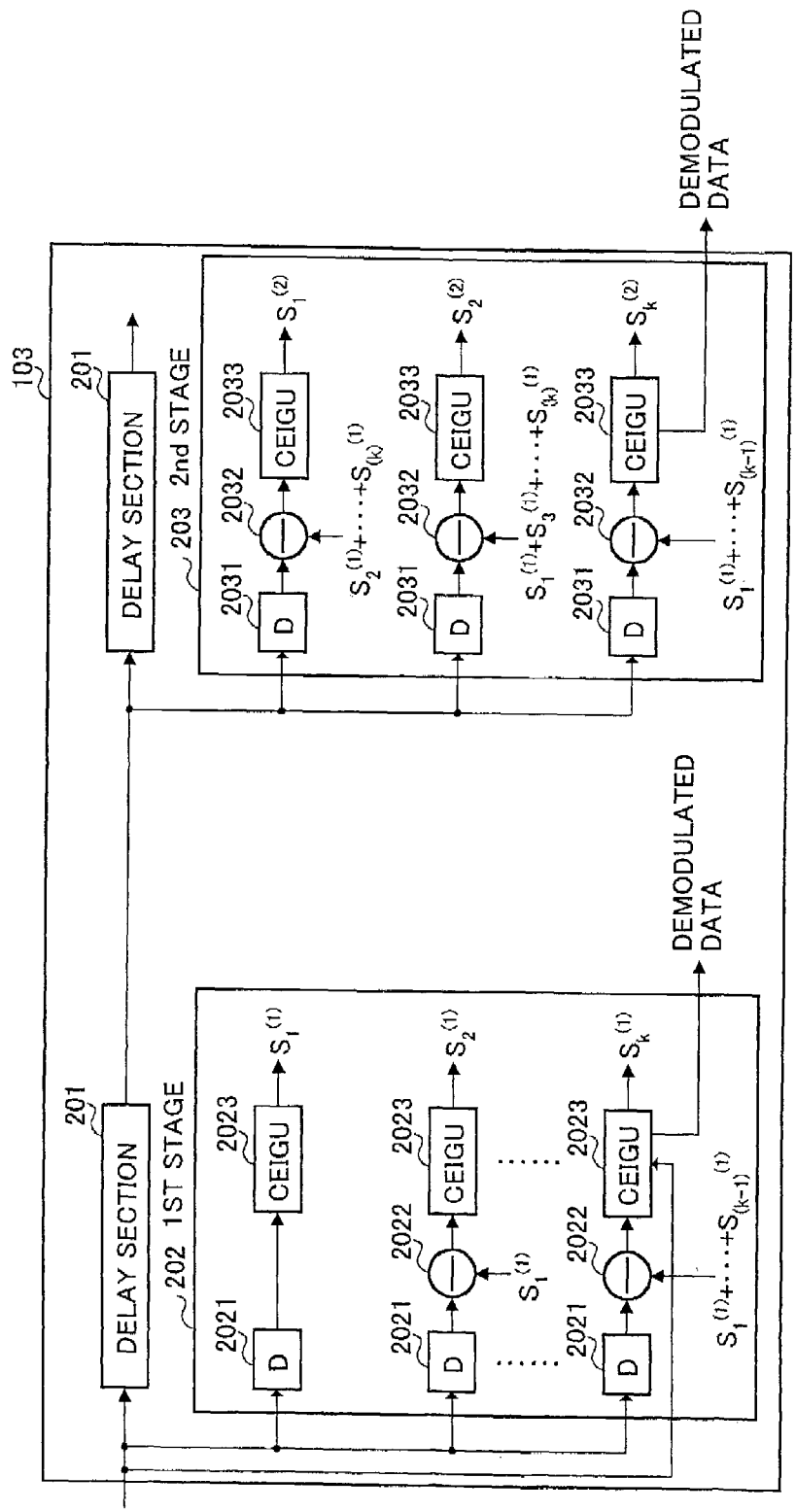
FIG. 5 is a block diagram showing a configuration of a demodulation section of the BTS of the radio infrastructure apparatus shown in FIG. 4.

Demodulation section 103 has a configuration shown in FIG. 5. Demodulation section 103 is a multi-stage type interference canceller and is constructed of serially connected stages each including delayers and interference canceller units. Delay section 201 is a memory to delay a received signal for interference cancellers in each stage to carry out processing. Each stage creates a replica (S) for a signal, which becomes interference and removes interference by subtracting this replica from the received signal. This allows demodulated data to be obtained with an SIR (signal to interference ratio) improved.

The interference canceller shown in FIG. 5 connects 1st stage 202 and 2nd stage 203, but it is also possible to connect three or more stages to construct an interference canceller.

Each interference canceller is provided with a plurality of processing lines and each processing line includes delayers 2021 and 2031, subtractors 2022 and 2032, channel estimation and interference generation units (hereinafter abbreviated as "CEIGU") 2023 and 2033. There is no signal to be subtracted in the first processing line of 1st stage interference canceller 202, and so subtractor 2022 is not provided.

Referring back to FIG. 4, the demodulated data obtained at demodulation section 103 of the BTS is output to SIR measuring section 104, where an SIR is measured using a known signal such as a pilot section (PL) of the data. Furthermore, the demodulated data is output to error detection section 109 and selection/combination section 113 of the RNC. Furthermore, demodulation section 103 outputs base station information (information of demodulation capabilities) to G parameter control section 112 and SIR versus error rate estimation section 110.

The SIR value measured by SIR measuring section 104 is output to addition section 105. A target SIR value for an inner loop is output from the RNC to addition section 105 and addition section 105 calculates whether the measured SIR value is higher or lower than the target SIR value. The difference information (whether the measured SIR value is higher or lower than the target SIR value) is output to TPC command decision section 106.

TPC command decision section 106 decides and generates a TPC command for instructing an increase or decrease of transmission power based on the difference information. TPC command decision section 106 then outputs the generated TPC command to multiplexing section 107. Multiplexing section 107 multiplexes the transmission data sent from the RNC and the TPC command and outputs the multiplexed signal to modulation section 108. Modulation section 108 digital-modulates the multiplexed signal and outputs the modulated signal to radio section 102. Modulation section 108 carries out channel CODEC, digital modulation processing and spreading/modulation processing, etc.

Radio section 102 carries out predetermined radio transmission processing (D/A conversion and up-conversion, etc.) on the modulated signal. This signal subjected to radio transmission processing is sent as a downlink signal through antenna 101 to a communication terminal with which the base station is communicating.

Then, the control station side will be explained. Selection/combination section 113 that has received the demodulated data from the BTS also receives demodulated data from other BTSs and selects demodulated data with higher quality and outputs as received data. This received data is output to error detection section 114.

Furthermore, the received data is output to error detection section 114 and error detection section 114 calculates an error rate. The calculated error rate is output to addition section 115. A target error rate is output to addition section 115, where it is decided whether the calculated error rate is higher or lower than the target error rate. This decision result is output to target SIR control section 116. Target SIR control section 116 controls the target SIR based on the decision result.

On the other hand, the demodulated data from the BTS is also output to error detection section 109. Error detection section 109 carries out error detection using the demodulated data and outputs an error rate such as BER and BLER to SIR versus error rate estimation section 110. SIR versus error rate estimation section 110 estimates an SIR versus error rate using the error rate, target SIR value and G parameter of the BTS, and demodulation capability of the BTS, etc. and decides whether a correction of the target SIR value is necessary or not.

For example, SIR versus error rate estimation section 110 stores the characteristic of an SIR versus error rate to be a reference beforehand, detects a difference between the SIR required to achieve a same error rate and the reference and decides, when the detected value is larger, to correct by that value. Then, SIR versus error rate estimation section 110 outputs the decision result as to whether the target SIR value should be corrected or not and the amount of correction to target SIR correction section 111.

Figure 9:
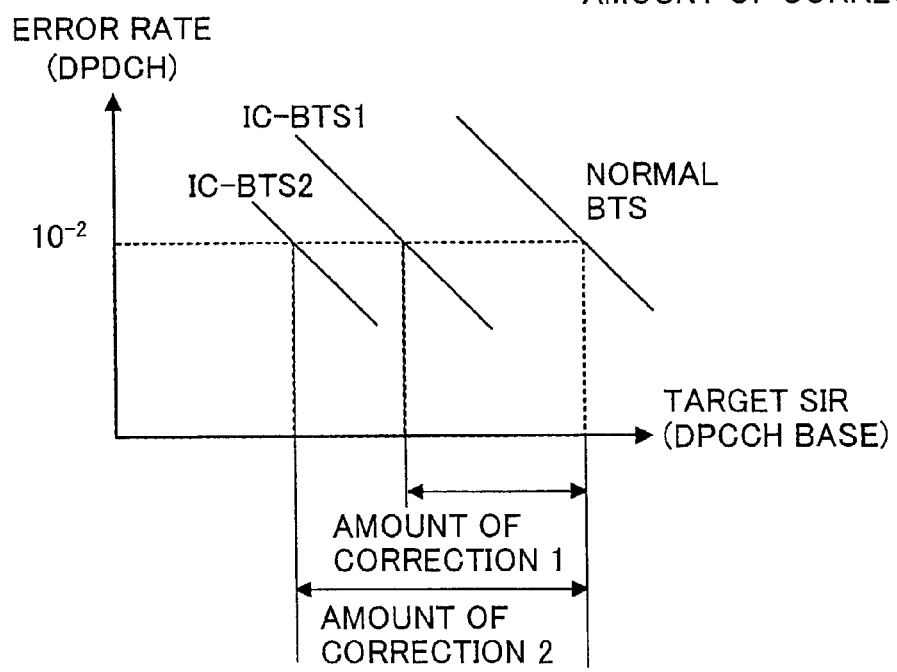
FIG. 9 is a characteristic diagram showing a relationship between an error rate and target SIR.

More specifically, the amount of correction is determined using, for example, the characteristic diagram shown in FIG. 9. FIG. 9 shows the SIR versus data section error rate characteristics of a BTS with no interference canceller (normal BTS), and BTS1 and BTS2 (with different interference cancellation performances) with an interference canceller. The reference SIR versus error rate characteristic, that is, a relationship between the target SIR of the DPCCH base and the error rate of the data section (DPDCH) varies depending on the gain factor. During a correction, the reference SIR versus error rate characteristic (e.g., normal BTS) is selected. The characteristic of the normal BTS is stored beforehand for each optimal gain factor actually used or acquired as base station information. Or a characteristic of a reference BTS at a specific gain factor is stored or acquired beforehand, corrected according to the actual optimal gain factor and the corrected characteristic is stored or acquired as base station information. As the correction method, for example, a method of shifting the characteristic by y dB according to an amount of variation x in the gain factor can be used. Then, an amount of correction of the target SIR at each BTS is determined by detecting a difference between the SIR required to achieve the same error rate as that of the reference BTS and the reference (equivalent to amount of correction 1 or 2 in FIG. 9) using the demodulation capability and the results of actual error rate measurements obtained beforehand as base station information and taking into account the characteristics shown in IC-BTS1 and IC-BTS2 in FIG. 9.

Target SIR correction section 111 corrects the target SIR value based on the decision result from SIR versus error rate estimation section 110 and the amount of correction thereof. The corrected target SIR value is output to addition section 105 of the BTS. The target SIR values may be either corrected for their respective BTSs separately and output (to the respective BTS) or corrected for the respective BTSs separately and then some of the target SIR values may be output to other BTSs as common target SIR values.

Furthermore, the information on the demodulation capability of the BTS is output to G parameter control section 112 and G parameter control section 112 determines an optimal gain factor. The G parameter indicating the determined gain factor is output to multiplexing section 107 of the BTS and multiplexed with the transmission data at multiplexing section 107. Furthermore, the G parameter is output to SIR versus error rate estimation section 110.

Figure 6:
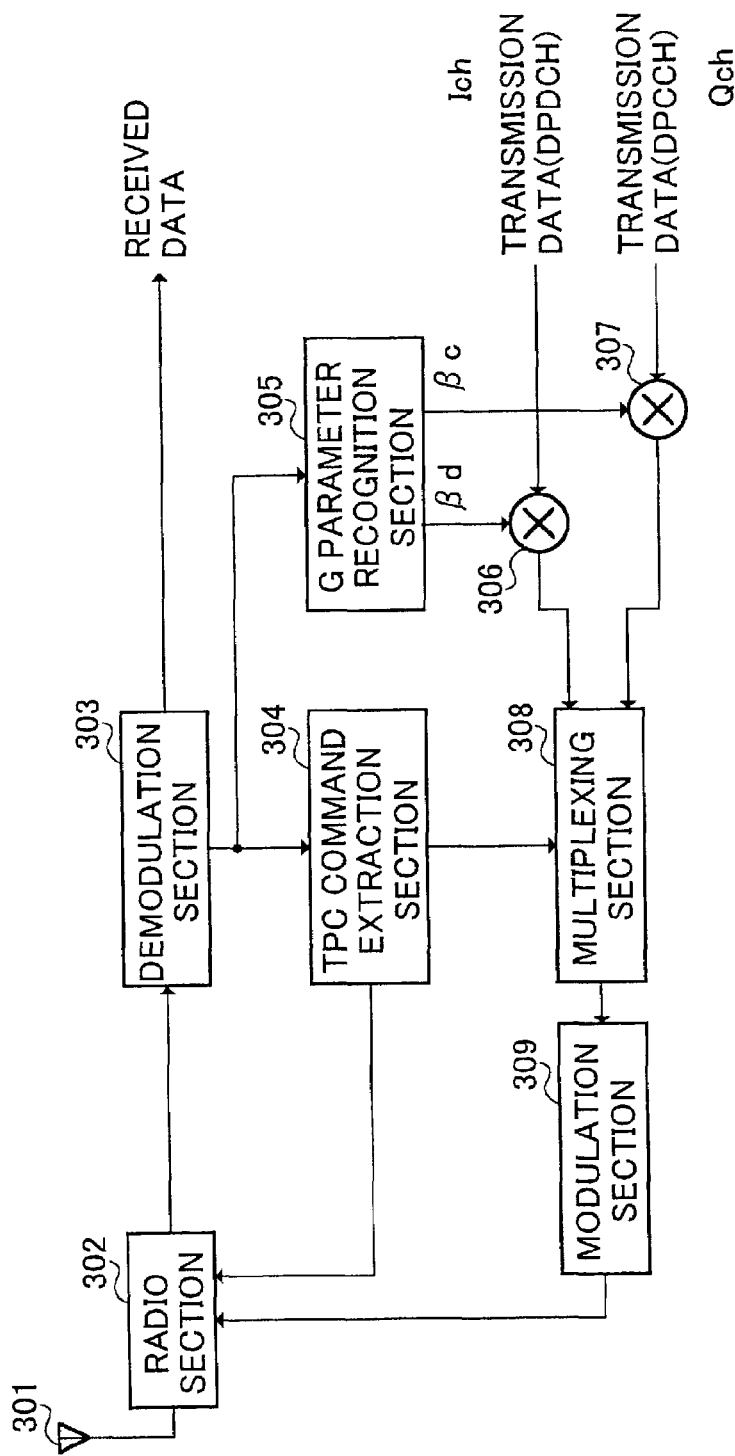
FIG. 6 is a block diagram showing a configuration of a communication terminal that carries out a radio communication with the radio infrastructure apparatus shown in FIG. 4.

FIG. 6 is a block diagram showing a configuration of a communication terminal (MS) that carries out a radio communication with the BTS. A downlink signal sent from the BTS with which the communication terminal is communicating is received by radio section 302 through antenna 301. Radio section 302 carries out predetermined radio reception processing (down-conversion and A/D conversion, etc.) on the downlink signal and outputs the signal after the radio reception processing to demodulation section 303. Demodulation section 303 carries out processing such as despreading processing, coherent detection, RAKE combining, channel CODEC and separation.

Data demodulated by demodulation section 303 is obtained as received data and also output to TPC command extraction section 304. TPC command extraction section 304 extracts a TPC command and outputs the instruction of the TPC command (for increasing or decreasing transmission power) to an amplifier (not shown) of radio section 302.

Moreover, the demodulated data is output to G parameter recognition section 305. G parameter recognition section 305 calculates gain factors β d, β c corresponding to the G parameter from the BTS and multiplies the transmission data by gain factors β d, β c. That is, the transmission data of DPDCH (Ich) is output to multiplication section 306, where the transmission data is multiplied by gain factor β d for DPDCH. The transmission data of DPCCH (Qch) is output to multiplication section 307, where the transmission data is multiplied by gain factor β c for DPCCH. The gains of DPDCH (Ich) and DPCCH (Qch) are adjusted in this way.

The transmission data of DPDCH and DPCCH multiplied by gain factors β d and β c are multiplexed by multiplexing section 308 and then output to modulation section 309. Modulation section 309 digital-modulates the multiplexed signal and outputs the modulated signal to radio section 302.

Radio section 302 carries out predetermined radio transmission processing (D/A conversion and up-conversion, etc.) on the demodulated signal. This signal subjected to radio transmission processing is sent to the BTS with which the communication terminal is communicating as an uplink signal through antenna 301.

Then, an operation of the radio infrastructure apparatus in the above-described configuration will be explained.

The infrastructure apparatus of the present invention sends information such as the presence/absence of an interference canceller or reception capability from the BTS to the RNC, controls a G parameter indicating a gain factor and thereby determines an optimal gain factor during diversity handover between base stations with and without an interference canceller or between base stations with different reception capabilities with respect to target SIR value such as the capabilities of interference cancellers. Then, the infrastructure apparatus corrects the target SIR (executes an outer loop) using the optimally adjusted gain factor, error rate, target error rate, etc.

Here, the gain factor (G) is intended to control the gain ratio (G parameter) of DPDCH to DPCCH of the uplink and varies from one TFC (Transport-Format Combination) to another. For example, at the highest rate, the gain factor may change from one radio frame to another. This gain factor may be signaled directly from the upper layer (network side) to an MS through a BTS or a reference value about reference TFC may be signaled to a BS through a BTS and the MS side may calculate the gain factor based on the reference value as appropriate. The present invention is applicable to both cases likewise.

Figure 7:
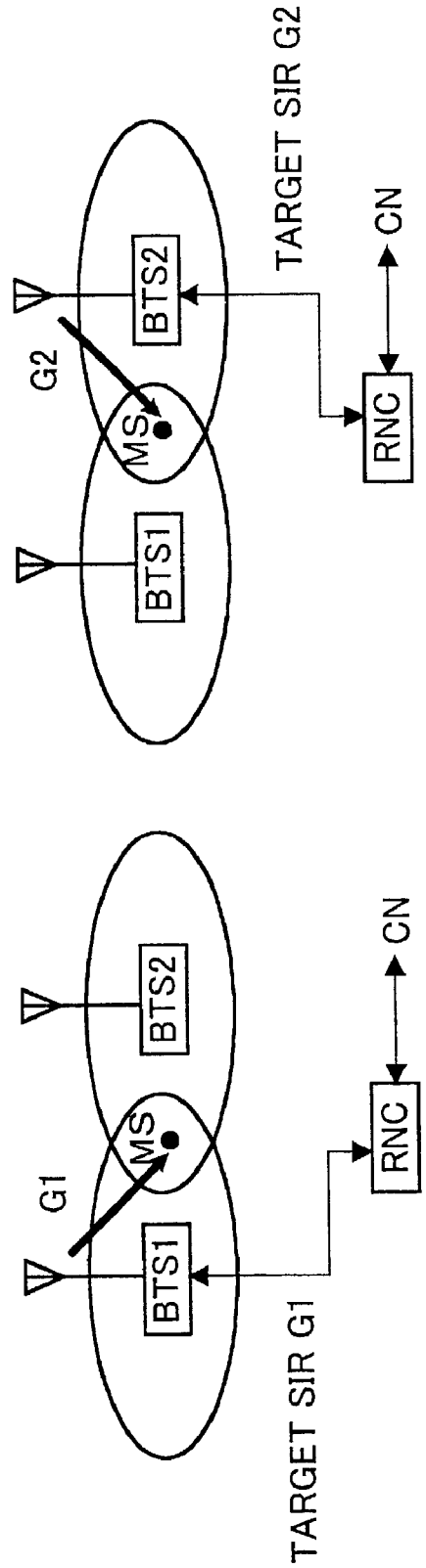
FIG. 7 illustrates a non-DHO state of the radio infrastructure apparatus according to Embodiment 1.

First, when diversity handover is not in progress (non-DHO state), optimal gain factors are determined based on the reception capabilities of BTS1 and BTS2 as shown in FIG. 7 and sent to the MS through the respective BTSs as G parameters (G1, G2). The MS sends the transmission data of DPDCH and DPCCH as an uplink signal to BTS1 or BTS2 with which the MS is communicating using gain factors β d, β c corresponding to the G parameters (G1, G2) received.

Furthermore, the target SIR value is corrected by the RNC based on the gain factor, reception capabilities of the respective BTSs, error rate measurement results of the respective BTSs and the corrected target SIR values are sent to BTS1 and BTS2. BTS1 and BTS2 perform transmission power control of the inner loop using the corrected target SIR values.

Figure 8:
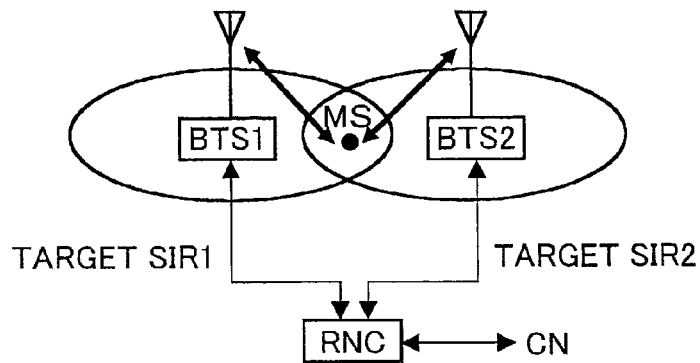
FIG. 8 illustrates a DHO state of the radio infrastructure apparatus according to Embodiment 1.

Then, when diversity handover is in progress (DHO state), a common optimal gain factor is determined based on the reception capabilities of BTS1 and BTS2 (DHO target BTSS) in the same way as the non-DHO state as shown in FIG. 8 and sent as the G parameters to the MS through the respective BTSs. The MS sends the transmission data of DPDCH and DPCCH as an uplink signal to BTS1 and BTS2 with which the MS is communicating using gain factors β d, β c corresponding to the G parameters received.

Furthermore, diversity handover takes place between BTSs with and without an interference canceller or between BTSs with different reception capabilities, the relationship between the SIR of DPCCH and quality of DPDCH (BER, BLER) varies from one BTS to another, and therefore the target SIR values are controlled for the respective BTSs separately.

The target SIR value is corrected by the RNC based on the gain factor, reception capabilities of the respective BTSs, error rate measurement results of the respective BTSs and the corrected target SIR values (target SIR1, target SIR2) are sent to BTS1 and BTS2. BTS1 and BTS2 perform transmission power control of the inner loop using the corrected target SIR values (target SIR1, target SIR2).

In this way, when diversity handover takes place between BTSs with and without an interference canceller or between BTSs with different reception capabilities, it is possible to decide a TPC command in such a way that the BTSs have the same DPDCH reception quality.

Here, determination of a gain factor will be explained. Information on the demodulation capability of the BTS is output to G parameter control section 112 in response to the uplink signal. G parameter control section 112 determines an optimal gain factor based on the number of BTSs connected, reception capability of each BTS, for example, whether an interference canceller is incorporated or not, interference cancellation performance of the interference canceller, reception characteristic gain by the interference canceller (gain in the system capacity) or the error rate measurement result for each BTS, etc.

There is no problem with an optimal gain factor during diversity handover between normal BTSs with no interference canceller, but how to determine an optimal gain factor is a problem between one BTS with an interference canceller and the other without an interference canceller or between BTSs with interference cancellers of different interference cancellation performances. That is, since the communication terminal needs to perform transmission to both BTSs in the process of diversity handover using one gain factor, the question is which BTS should be used as a reference to determine the gain factor.

Thus, as described above, the gain factor is determined taking into consideration the number of BTSs connected, reception capability of each BTS, for example, whether an interference canceller is incorporated or not, interference cancellation performance of the interference canceller, reception characteristic gain of the interference canceller (gain in the system capacity) or the error rate measurement result for each BTS, etc. In this case, the gain factor can be determined using any BTS as a reference or a new optimal gain factor can be determined taking into consideration the situation of any BTS.

There is no particular restriction on determination of an optimal gain factor as it is performed according to each of or a combination of factors like the number of BTSs connected, reception capability of each BTS, for example, whether an interference canceller is incorporated or not, interference cancellation performance of the interference canceller, reception characteristic gain of the interference canceller (gain in the system capacity) or the error rate measurement result for each BTS, etc.

Then, correction of a target SIR value will be explained. The error rate measurement result of each BTS obtained from the demodulated data is output to SIR versus error rate estimation section 110. SIR versus error rate estimation section 110 calculates an amount of correction of the target SIR taking into consideration the number of BTSs connected, reception capability of each BTS, for example, whether an interference canceller is incorporated or not, interference cancellation performance of the interference canceller, reception characteristic gain of the interference canceller (gain in the system capacity), etc.

More specifically, when an amount of correction of the target SIR is calculated based on the error rate measurement result, for example, the characteristic diagram shown in FIG. 9 is used. In FIG. 9, an amount of correction is calculated from the value of an error rate of DPDCH of each BTS with reference to the characteristic line. For example, when diversity handover takes place between a normal BTS and BTS1, the amount of correction of the target SIR (DPCCH base) is assumed to be amount of correction 1 to achieve a required error rate $10^{-2}$. On the other hand, when diversity handover takes place between a normal BTS and BTS2, the amount of correction of the target SIR is assumed to be amount of correction 2 to achieve a required error rate $10^{-2}$.

Thus, unlike the gain factor, the amount of correction of a target SIR can be determined individually according to the actual situation of the BTS. Even when diversity handover takes place between BTSs with different capabilities, this makes it possible to perform appropriate transmission power control over the inner loop according to the actual situation.

There is no particular restriction on determination of an amount of correction of a target SIR as it is carried out according to each of or a combination of factors like reception capability of each BTS, for example, whether an interference canceller is incorporated or not, interference cancellation performance of the interference canceller, reception characteristic gain of the interference canceller (gain in the system capacity), target SIR value, gain factor or the error rate measurement result for each BTS, etc.

Thus, the radio infrastructure apparatus according to this embodiment controls a gain factor and target SIR value taking into consideration the reception capabilities of base stations, etc. and can thereby perform communications with an optimal gain factor taking advantage of effects of interference cancellers and without deteriorating the reception capabilities of base stations when diversity handover takes place between base stations with and without an interference canceller or between base stations with different reception capabilities.

When the RNC corrects a target SIR, the base station can control with the target SIR specified by the RNC, and thereby reduce the burden on the base station apparatus. When many base stations are installed, it is necessary to reduce the cost and size of each base station, and therefore such a configuration is preferred.

Embodiment 2

Figure 10:
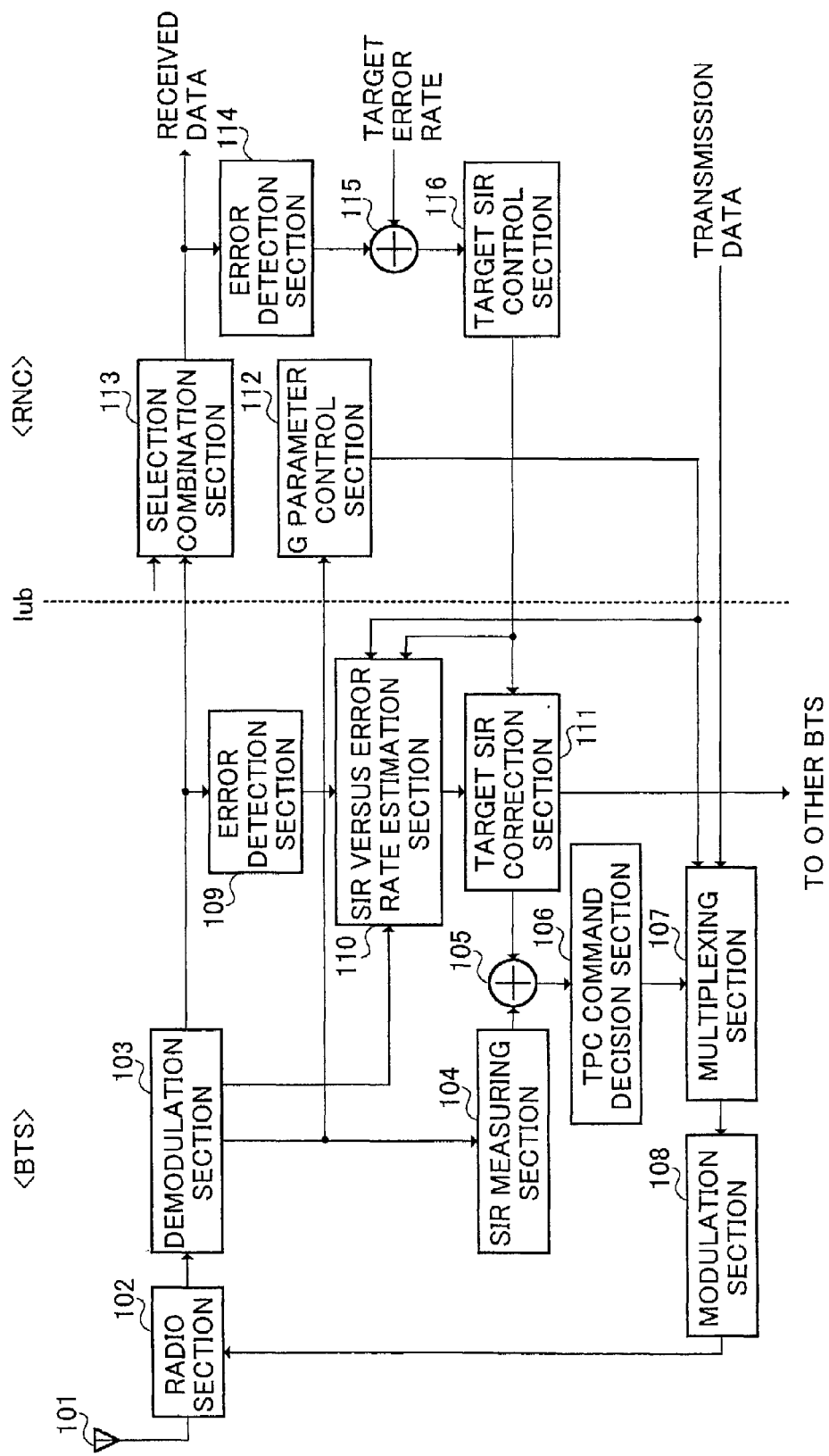
FIG. 10 is a block diagram showing a configuration of a radio infrastructure apparatus according to Embodiment 2 of the present invention.

FIG. 10 is a block diagram showing a configuration of a radio infrastructure apparatus according to Embodiment 2 of the present invention. In FIG. 10, "BTS" denotes abase station and "RNC" denotes a control station. "Iub" denotes an interface. In FIG. 10, the same components as those in FIG. 4 are assigned the same reference numerals as those in FIG. 4 and detailed explanations thereof will be omitted. The radio infrastructure apparatus according to this embodiment adopts a configuration whereby a target SIR is corrected inside the BTS.

In the radio infrastructure apparatus shown in FIG. 10, the BTS outputs demodulated data to error detection section 109. Error detection section 109 carries out error detection using the demodulated data and outputs error rates such as BER and BLER to SIR versus error rate estimation section 110. SIR versus error rate estimation section 110 estimates an SIR versus error rate using the error rate, target SIR value, G parameter of each BTS, and demodulation capability of each BTS, etc. and decides whether a correction of the target SIR value is necessary or not. Then, SIR versus error rate estimation section 110 outputs the decision result as to whether the target SIR value should be corrected or not to target SIR correction section 111.

Target SIR correction section 111 corrects the target SIR value based on the decision result from SIR versus error rate estimation section 110. The corrected target SIR value is output to addition section 105 of the BTS.

Then, an operation of the radio infrastructure apparatus in the above-described configuration will be explained.

In the case of a non-DHO state, a common gain factor specified by the RNC is sent to BTS1 or BTS2 and BTS1 or BTS2 determines an optimal gain factor based on reception capabilities, etc. and sends the optimal gain factor as G parameters (G1, G2) to an MS through each BTS. The MS sends the transmission data of DPDCH and DPCCH as an uplink signal to BTS1 or BTS2 with which the MS is communicating using gain factors β d, β c corresponding to the G parameters (G1, G2) received.

With regard to the target SIR value, the target SIR value commonly controlled by the RNC is sent to BTS1 or BTS2 and corrected by BTS1 or BTS2 based on the gain factor, reception capabilities of the respective BTSs, error rate measurement results of the respective BTSs. BTS1 and BTS2 perform transmission power control over the inner loop using the corrected target SIR values (target SIR1, target SIR2).

Figure 11:
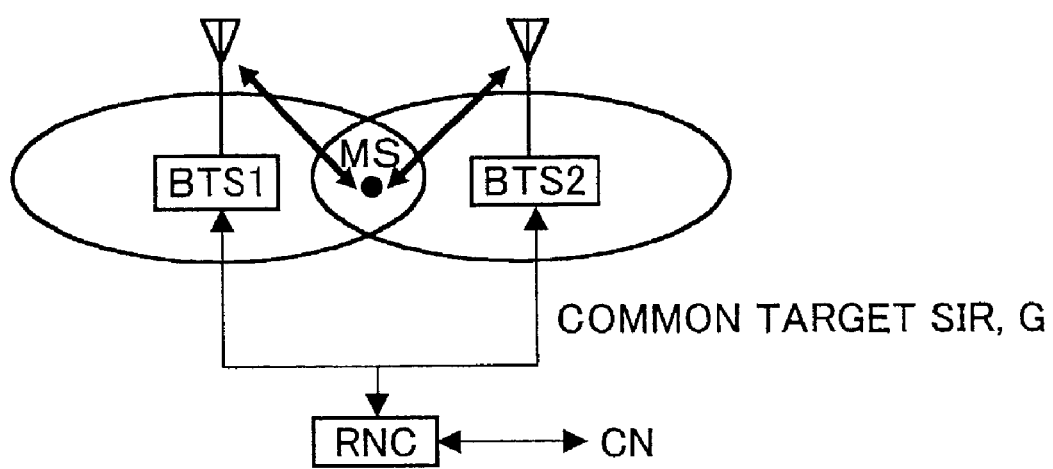
FIG. 11 illustrates a DHO state of the radio infrastructure apparatus according to Embodiment 2.

Then, in a DHO state, the common gain factor specified by the RNC is sent to BTS1 and BTS2 as shown in FIG. 11 and sent to the MS through the respective BTSs. The MS sends the transmission data of DPDCH and DPCCH as uplink signals to BTS1 and BTS2 with which the MS is communicating using gain factors β d, β c corresponding to the G parameters received.

With regard to the target SIR value, the target SIR value commonly controlled by the RNC is sent to BTS1, and BTS2 and BTS1 and BTS2 correct the target SIR value based on the gain factor, reception capabilities of the respective BTSs, error rate measurement results of the respective BTSs and perform transmission power control over the inner loop using the corrected target SIR values (target SIR1, target SIR2).

In this way, when diversity handover takes place between BTSs with or without an interference canceller or between BTSs with different capabilities, it is possible to decide a TPC command in such a way that the BTSs have the same DPDCH reception quality.

Thus, since the radio infrastructure apparatus according to this embodiment also controls a gain factor and target SIR value taking into consideration the reception capabilities of base stations, etc. and therefore it is possible to perform communications with an optimal gain factor taking advantage of the effects of the interference cancellers without deteriorating the reception capabilities of the base stations during diversity handover between base stations with and without an interference canceller or between base stations with interference cancellers of different capabilities.

When the base station corrects a target SIR, the RNC only needs to transmit a conventional common target SIR to a plurality of base stations during DHO in the same way as the conventional art, and even when an interference canceller is introduced to a specific base station later, there is no need to change the configuration of the RNC a great deal. Since the base station can perform control with the target SIR individually according to the own reception capability or the amount of change of reception capability by introduction of an interference canceller, it is possible to reduce the burden on the RNC such as additions of functions. This configuration is preferred when an apparatus is added for drastically improving the reception capability for the target SIR value, for example, by only introducing an interference canceller to a base station of some specific area, not all areas under the control of one RNC.

Embodiment 3

This embodiment will describe a case where a handover (HO) algorithm and its decision parameter, etc. are adaptively controlled according to a selection situation of an optimal gain factor and a difference in reception capability between BTSs.

Figure 12:
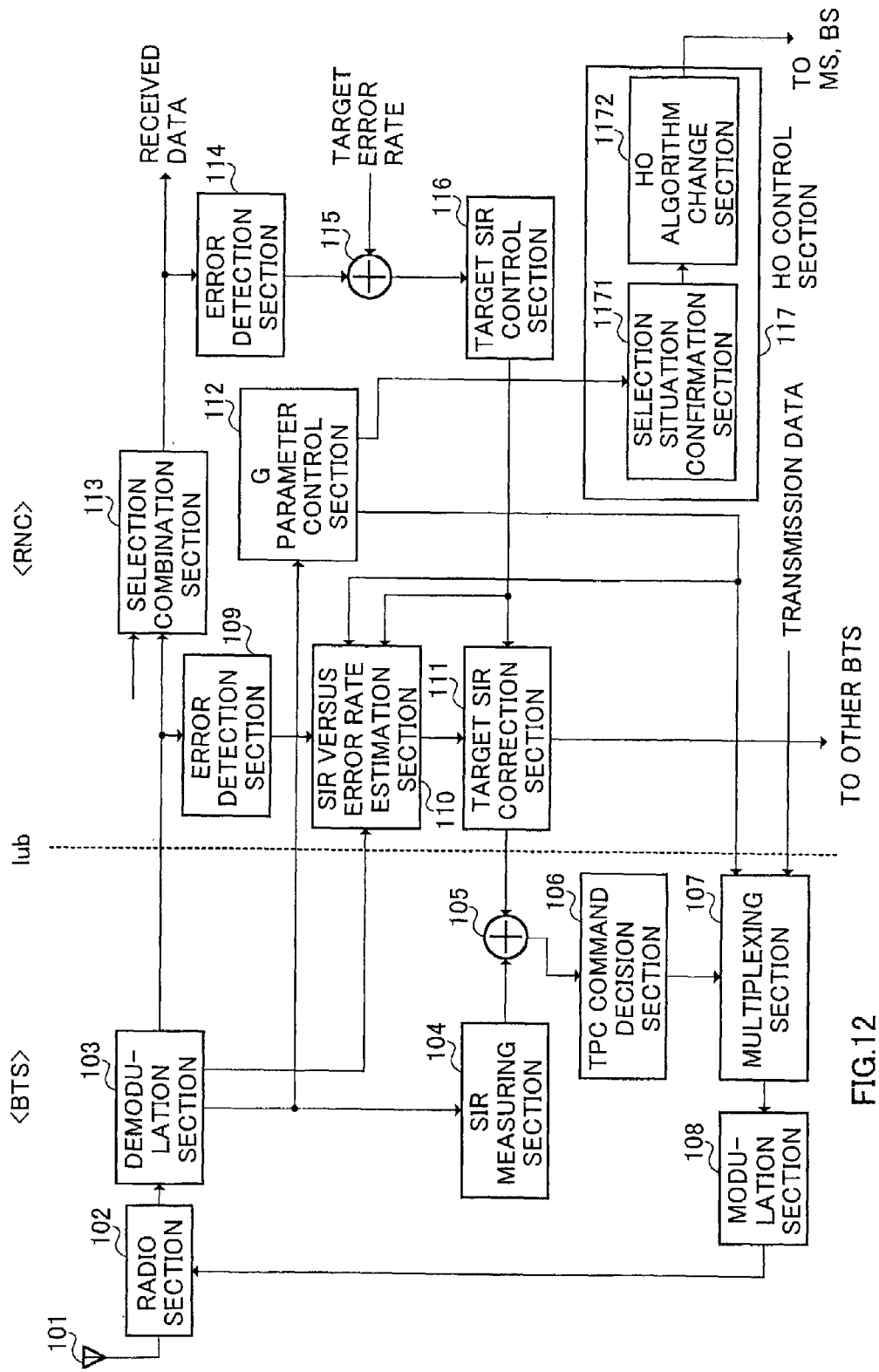
FIG. 12 is a block diagram showing a configuration of a radio infrastructure apparatus according to Embodiment 3 of the present invention.

FIG. 12 is a block diagram showing a configuration of a radio infrastructure apparatus according to Embodiment 3 of the present invention. In FIG. 12, the same components as those in FIG. 4 are assigned the same reference numerals as those in FIG. 4 and detailed explanations thereof will be omitted.

The radio infrastructure apparatus shown in FIG. 12 is provided with HO control section 117 that controls a handover algorithm and decision parameter thereof, etc. based on the G parameter determined by the G parameter control section. This HO control section 117 includes selection situation confirmation section 1171 that confirms the gain factor selection situation based on a G parameter entered and HO algorithm change section 1172 that changes the HO algorithm based on the confirmation result of the selection situation.

The operation of the radio infrastructure apparatus in the above-described configuration is the same as that of Embodiment 1 except the control for changing the HO algorithm using the G parameter. Selection situation confirmation section 1171 confirms whether the G parameter selected by G parameter control section 112 is significantly different from the optimal gain factor at each BTS or not. The specific method for confirmation can be performed through threshold decision for an optimal gain factor, etc.

When the G parameter selected at a BTS is significantly different from the optimal gain factor, a control signal indicating that difference is transmitted to HO algorithm change section 1172 and the HO algorithm is changed. By the way, there is no particular restriction on the HO algorithm to be changed.

For example, for diversity handover between a BTS with an interference canceller and another BTS with no interference canceller, it is basically desirable to determine a gain factor according to the BTS with no interference canceller (normal BTS) in order to perform favorable demodulation of DPDCH.

This is because, when a communication is performed with a gain factor according to the BTS with a canceller, the reception power of the data section of normal BTS is too small to perform correct demodulation for the SIR suitable for reception of DPCCH. Furthermore, when an attempt is made to correct the target SIR according to the error rate of the data section and increase the reception power, not only communication quality of DPCCH becomes excessive, but also the communication terminal performs transmission excessively, which causes great interference with the system and causes large power consumption of the battery.

However, with the gain factor adapted to such a normal BTS, it is not possible to take advantage of the effects of extension of service life of the terminal due to a reduction of DPDCH transmission power obtained by the introduction of the interference canceller or increase of the system capacity by the reduction of the amount of interference by a reduction of transmission power.

Thus, when diversity handover takes place between a normal BTS and a BTS with an interference canceller, the algorithm is changed to an HO algorithm that will cut the channel for the normal BTS ahead of time. Based on the changed HO algorithm, the RNC carries out HO control over the communication terminal.

Thus, the radio infrastructure apparatus according to this embodiment controls a gain factor and target SIR value taking into consideration the reception capabilities of base stations, and therefore during diversity handover between base stations with and without an interference canceller or between base stations with interference cancellers of different reception capabilities, the radio infrastructure apparatus can not only perform communications taking advantage of the effects of the interference canceller without deteriorating the reception capabilities of base stations and with an optimal gain factor but also adaptively control the HO algorithm and its decision parameter, etc. according to the optimal gain factor selection situation and difference in reception capability between BTSs and make full use of the effects of introducing the interference canceller.

Figure 13:
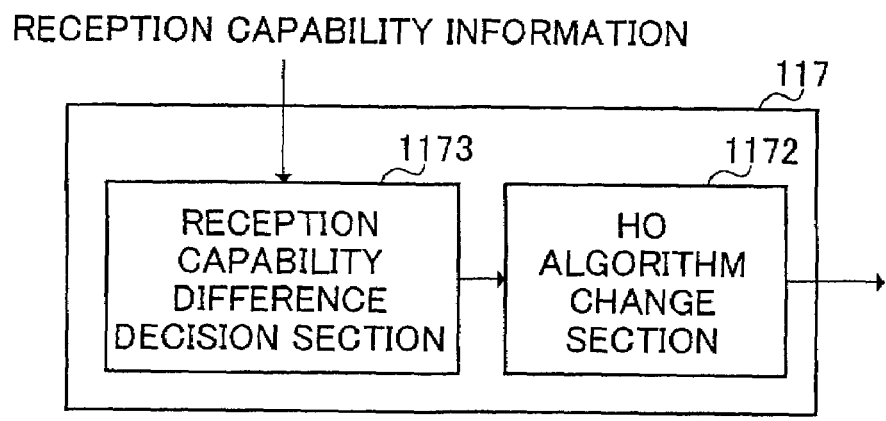
FIG. 13 is a block diagram showing another example of the HO control section of the radio infrastructure apparatus shown in FIG. 12.

In this embodiment, HO control section 117 can also be constructed of reception capability difference decision section 1173 that decides a difference in reception capability between BTSs and HO algorithm change section 1172 as shown in FIG. 13 and the HO algorithm can be changed when there are great differences in reception capability between BTSs notified from the higher layer. The effects of this embodiment can be fully exploited in this case, too.

The present invention is not limited to foregoing Embodiments 1 to 3, but can be implemented with various modifications. For example, foregoing Embodiments 1 to 3 describe the case where an MUD is used as the interference canceller, but the present invention is also applicable to cases where an SUD or symbol ranking type interference canceller is used as the interference canceller.

Furthermore, foregoing Embodiments 1 to 3 have described the case where modulation processing is carried out after data is multiplexed, but the present invention has no particular restrictions on the sequence of data multiplexing (frame assembly) and channel CODEC and data can also be multiplexed after modulation processing is carried out.

As described above, the radio infrastructure apparatus of the present invention controls a gain factor and target SIR value taking into consideration reception capabilities of base stations, etc. and therefore during diversity handover between base stations with and without an interference canceller or between base stations with different reception capabilities with respect to target SIR values such as capabilities of interference cancellers, the radio infrastructure apparatus can not only perform communications taking advantage of the effects of the interference canceller without deteriorating the reception capabilities of base stations and with an optimal gain factor.

This application is based on the Japanese Patent Application No.2000-363621 filed on Nov. 29, 2000, entire content of which is expressly incorporated by reference herein.

Industrial Applicability

The present invention is ideally applicable to a digital radio communication system and a radio infrastructure apparatus in a CDMA (Code Division Multiple Access) system in particular.

What is claimed is:

1. A radio infrastructure apparatus comprising:
a base station apparatus including a measuring section that measures a signal to interference ratio using an uplink signal made up of a data channel code-multiplexed with a control channel and a transmission power control section that generates a transmission power control signal from said signal to interference ratio and a target signal to interference ratio; and
a control station including a first control section that controls gain factors corresponding to said data channel and said control channel based on base station information from each base station, a selection combination section that selects demodulated data that fulfills predetermined quality from demodulated data obtained in a plurality of base station apparatuses and outputs the selected demodulated data as received data, a second control section that controls said target signal to interference ratio based on a decision result of a comparison between an error rate determined from the output received data and a target error rate, and a correction section that corrects said target signal to interference ratio using said base station information and said gain factors.

2. The radio infrastructure apparatus according to claim 1, wherein when no diversity handover is in progress, the first control section controls the gain factors based on the base station information and the correction section corrects the target signal to interference ratio based on said base station information.

3. The radio infrastructure apparatus according to claim 1, wherein when diversity handover is in progress, the first control section determines a common gain factor based on the base station information and the correction section corrects the target signal to interference ratio for each handover target base station individually based on said base station information.

4. A radio infrastructure apparatus comprising:
a base station apparatus including a measuring section that measures a signal to interference ratio using an uplink signal made up of a data channel codemultiplexed with a control channel, a transmission power control section that generates a transmission power control signal from said signal to interference ratio and a target signal to interference ratio and a correction section that corrects said target signal to interference ratio using base station information and said gain factors corresponding to said data channel and said control channel; and a control station including a selection combination section that selects demodulated data that fulfills predetermined quality from demodulated data obtained in a plurality of base station apparatuses and outputs the selected demodulated data as received data, a control section that controls said target signal to interference ratio based on a decision result of a comparison between an error rate determined from the output received data and a target error rate, and a correction section that corrects said target signal to interference ratio using said base station information and said gain factors.

5. The radio infrastructure apparatus according to claim 1, wherein the gain factors are controlled using at least one parameter selected from the group of the number of base stations connected, the reception capability of each base station, and the error rate measurement result for each base station.

6. The radio infrastructure apparatus according to claim 1, wherein the base station information is at least one selected from a group of reception capabilities and error rate measurement results of the base station apparatuses.

7. The radio infrastructure apparatus according to claim 6, wherein the reception capability consists of the presence/absence of an interference canceller, reception characteristic gain, difference in the degree of improvement of reception characteristics of the data channel and control channel or the range of a channel to which the interference canceller is applied and the number of channels.

8. The radio infrastructure apparatus according to claim 1, wherein the target signal to interference ratio is corrected using at least one parameter selected from a group of parameters of base station information, gain factors corresponding to the data channel and control channel, common target signal to interference ratio and error rate measurement result of each base station.

9. The radio infrastructure apparatus according to claim 1, further comprising a handover control section that changes a handover algorithm or a decision parameter, according to a gain factor selection situation and differences in base station information between the target base stations.

10. A radio base station apparatus comprising a transmission section for transmitting gain factors determined by the radio infrastructure apparatus according to claim 1 to a communication terminal apparatus.

11. A communication terminal apparatus comprising:
a gain adjustment section that adjusts the gains of a data channel and control channel using the gain factors determined by the radio infrastructure apparatus according to claim 1; and
a multiplexing section that code-multiplexes the data channel and control channel whose gains have been adjusted.

12. A gain factor control method comprising the steps of:
at a base station apparatus:
measuring a signal to interference ratio using an uplink signal made up of a data channel code-multiplexed with a control channel; and
generating a transmission power control signal from said signal to interference ratio and a target signal to interference ratio; and
at a control station:
controlling gain factors corresponding to said data channel and said control channel based on base station information front each base station;
selecting demodulated data that fulfills predetermined quality from demodulated data obtained in a plurality of base station apparatuses and outputting the selected demodulated data as received data;

controlling said target signal to interference ratio based on a decision result of a comparison between an error rate determined from the output received data and a target error rate; and correcting said target signal to interference ratio using said base station information and said gain factors.

13. A gain factor control method comprising the steps of:

at a base station apparatus:

measuring a signal to interference ratio using an uplink signal made up of a data channel codemultiplexed with a control channel; and generating a transmission power control signal from said signal to interference ratio and a target signal to interference ratio; and at a control station:

selecting demodulated data that fulfills predetermined quality from demodulated data obtained in a plurality of base station apparatuses and outputting the selected demodulated data as received data;

controlling said target signal to interference ratio based on a decision result of a comparison between an error rate determined from the output received data and a target error rate; and correcting said target signal to interference ratio using base station information and gain factors.

* * * * *